United States Patent
Sidhu et al.

(10) Patent No.: US 9,555,475 B2
(45) Date of Patent: Jan. 31, 2017

(54) ADDITIVE LAYER MANUFACTURING

(71) Applicant: BAE SYSTEMS plc, London (GB)

(72) Inventors: Jagjit Sidhu, Bristol (GB); Andrew David Wescott, Bristol (GB); Mark Alfred Potter, Preston (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/440,283

(22) PCT Filed: Nov. 6, 2013

(86) PCT No.: PCT/GB2013/052898
§ 371 (c)(1),
(2) Date: May 1, 2015

(87) PCT Pub. No.: WO2014/072699
PCT Pub. Date: May 15, 2014

(65) Prior Publication Data
US 2015/0306665 A1    Oct. 29, 2015

(30) Foreign Application Priority Data

Nov. 9, 2012  (EP) .................................... 12275170
Nov. 9, 2012  (GB) .................................. 1220225.5

(51) Int. Cl.
B23K 26/34    (2014.01)
B22F 3/105    (2006.01)
(Continued)

(52) U.S. Cl.
CPC ............... B22F 3/1055 (2013.01); B22F 7/04 (2013.01); B23K 9/04 (2013.01); B23K 9/0956 (2013.01);
(Continued)

(58) Field of Classification Search
None
See application file for complete search history.

(56) References Cited

U.S. PATENT DOCUMENTS 6,580,959 B1    6/2003  Mazumder
6,605,795 B1 *  8/2003  Arcella ................. B22F 3/1055
                                                    219/121.63
(Continued)

FOREIGN PATENT DOCUMENTS

EP    2011631 A1    1/2009
EP    2052693 A1    4/2009
(Continued)

OTHER PUBLICATIONS

Examination Report received in Great Britain Patent Application No. GB1220225.5, dated Dec. 2, 2015, 5 pages.
(Continued)

Primary Examiner — Binu Thomas
(74) Attorney, Agent, or Firm — Finch & Maloney PLLC

(57) ABSTRACT

Apparatus and a method for forming a metallic component by additive layer manufacturing are provided. The method includes the steps of mounting a work piece (3) to ALM manufacturing apparatus including measuring means in the form of load cells (13, 14) to measure stresses tending to distort the work piece, using a laser heat source (24) to apply heat to a surface (18) of the work piece (3) sufficient to melt it; adding metallic material to the melted surface (18) and moving the heat source (24) relative to the work piece (3) whereby progressively to form a layer (30) of metallic material on it; repeating the above steps as required, whereby progressively to form the component and, while doing so, measuring stresses tending to distort the component with the load cells (13, 14) and, if they are above a predetermined threshold, stress relieving the work piece with means such as a pulsed laser (27) while still mounted (Continued)

Figure 1:
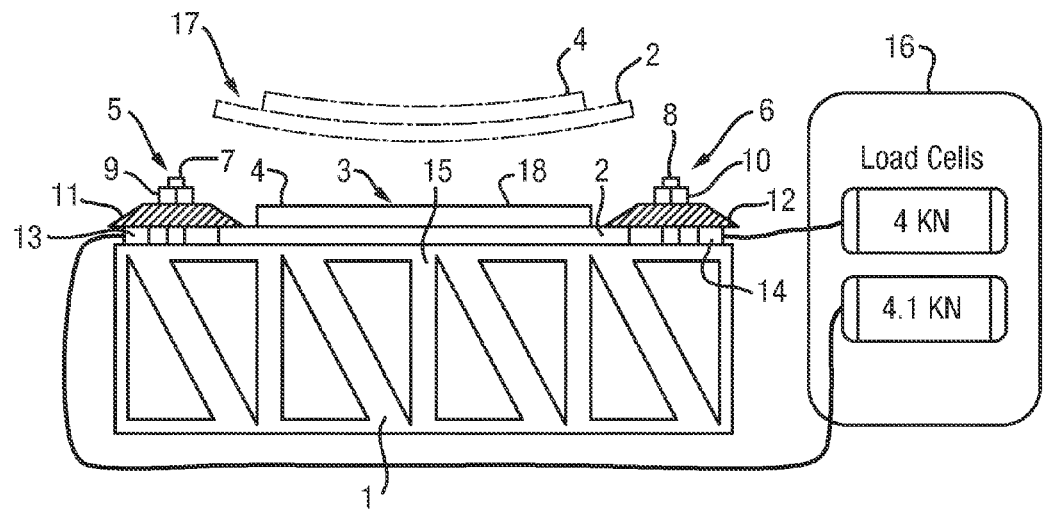

to the apparatus to reduce distortion to a predetermined level, and again repeating above steps as required to complete the component. A computer (16) may be included to control the whole process.

6 Claims, 2 Drawing Sheets

(51) Int. Cl.
| | |
|---|---|
| *B29C 67/00* | (2006.01) |
| *B05C 11/00* | (2006.01) |
| *B22F 7/04* | (2006.01) |
| *B23K 9/04* | (2006.01) |
| *B23K 9/095* | (2006.01) |
| *B33Y 10/00* | (2015.01) |
| *B33Y 30/00* | (2015.01) |
| *B33Y 50/02* | (2015.01) |

(52) U.S. Cl.
CPC ............ *B23K 26/34* (2013.01); *B23K 26/354* (2015.10); *B29C 67/0066* (2013.01); *B29C 67/0074* (2013.01); *B29C 67/0077* (2013.01); *B29C 67/0088* (2013.01); *B22F 2003/1056* (2013.01); *B22F 2003/1057* (2013.01); *B22F 2007/042* (2013.01); *B33Y 10/00* (2014.12); *B33Y 30/00* (2014.12); *B33Y 50/02* (2014.12); *Y02P 10/295* (2015.11)

(56) References Cited

U.S. PATENT DOCUMENTS

| | | | |
|---|---|---|---|
| 6,925,346 B1 | 8/2005 | Mazumder et al. | |
| 7,286,893 B1* | 10/2007 | Mazumder | ............ B23K 26/34 |
| | | | 219/121.66 |
| 2003/0206820 A1* | 11/2003 | Keicher | ................ B22F 3/1055 |
| | | | 419/9 |
| 2007/0205184 A1 | 9/2007 | Mazumder et al. | |
| 2009/0020901 A1* | 1/2009 | Schillen | ............ B29C 67/0051 |
| | | | 264/31 |
| 2011/0305590 A1* | 12/2011 | Wescott | ................ B22F 3/1055 |
| | | | 118/620 |
| 2012/0100030 A1 | 4/2012 | Green | |
| 2013/0101728 A1* | 4/2013 | Keremes | ................ B22F 3/1055 |
| | | | 118/708 |

FOREIGN PATENT DOCUMENTS

| | | |
|---|---|---|
| WO | 0000921 | 1/2000 |
| WO | 2014072699 A1 | 5/2014 |

OTHER PUBLICATIONS

International Preliminary Report on Patentability and Written Opinion received for PCT/GB2013/052898. Date of mailing: May 21, 2015. 9 pages.
International Search Report and Written Opinion received for Patent Application No. PCT/GB2013/052898, mailed on Apr. 24, 2014. 13 pages.
GB Intellectual Property Office Search Report under Section 17(5) received for GB Patent Application No. 1220225.5 mailed Mar. 7, 2013. 3 pages.
EP Intellectual Property Office Extended Search Report received for EP Patent Application No. 12275170.4, mailed on Apr. 12, 2013. 7 pages.
Baufeld, et al., "Mechanical properties of Ti-6A1-4V specimens produced by shaped metal deposition," Science Technology of Advanced Materials, vol. 10. 2009. pp. 1-10.

* cited by examiner

ADDITIVE LAYER MANUFACTURING

This invention relates to additive layer manufacturing (ALM) and in particular to apparatus and a method to relieve stress in a component manufactured by an ALM process.

ALM is a relatively new consolidation process that is able to produce a functional complex part, layer by layer, without moulds or dies. This process uses a powerful heat source such as a laser beam or a welding arc to melt a controlled amount of metal in the form of metallic powder or wire, which is then deposited, initially, on a base plate of a work piece. Subsequent layers are then built up upon each preceding layer. As opposed to conventional machining processes, this computer-aided manufacturing (CAM) technology builds complete functional parts or, alternatively, builds features on existing components, by adding material rather than by removing it.

Currently known ALM manufacturing techniques include: Laser Blown Powder, Laser Powder Bed, and Wire and Arc technologies. Laser Blown Powder technology will be focused upon, here, as being particularly suitable for use with the present invention, but broad details of Laser Powder Bed and Wire and Arc technologies are as follows.

Laser Powder Bed technology uses a laser to melt metallic powder contained in a powder bed. The work piece is mounted within the powder bed and the surface of the powder is levelled off so as to just cover the surface of the work piece. The laser is then scanned over the work piece along a path which defines the shape of the component to be manufactured. Powder is melted to this shape and solidifies to a layer of metal on the work piece in the desired shape. The powder is then re-levelled, slightly higher, and the process is repeated until the component has been fully formed.

Wire and Arc technology, instead of using a laser as a heat source and metallic powder as the incremental material, uses a known welding arc to melt additive layer material in the form of a wire. The process is carried out on a similar scale to conventional welding but with many more "passes" being used to construct the component.

In the Laser Blown Powder process, during deposition of the initial layer(s), the laser beam is directed at a piece of starting material of the work piece or "parent plate" to create a weld pool in the parent plate to which the powder is added. The powder is carried to the focal point of the laser in a precisely directed carrier gas such as Argon.

It is a problem with this type of manufacturing that, during weld pool creation, the work piece is subject to intense localised heating. This heating creates steep thermal gradients in the work piece between the molten material in the weld pool and cold material which surrounds it. If transverse compressive stresses in the work piece, which are caused by very hot expanding material, exceed the yield point of the material then compressive plastic yielding (CPY) will occur in the material surrounding the weld. On cooling and shrinkage of the work piece, high tensile residual transverse stresses will be created across the weld and these will be balanced by residual compressive stresses further away from the weld. It is these residual compressive stresses which cause buckling distortion when they exceed a critical buckling load (CBL) for the parent material of the work piece. This is a particular difficulty when working with thin section material.

This invention relates to the management of stresses in the manufacture of metallic parts or machine pre-formed blanks produced by additive layer manufacturing means. It is usual for those skilled in the art to manufacture said blanks by building up flanges, or blocks of material by ALM onto an existing plate or other substrate, of which one such example would be titanium. Such a process might also find application in the building up of material in a finished part that is undergoing repair. One such example might be an aircraft frame where a machine cutter has inadvertently caused damage to the part in the final stages of manufacture, and the part is in need of repair by ALM.

The prior art of additive manufacture of laying down new material onto a pre existing parent plate, results in significant part distortion. In most cases the work piece is heavily clamped in such a way that distortion during the build process is prevented by clamping the work piece to a heavy thick section steel structure. As the component is built up layer by layer, the stress levels in the component are increased proportionally. When the build is complete the clamps have to be released which exposes operators building the component to the dangers of releasing the stored energy retained by the clamps.

Once the component has been released from its support structure the internal stresses that accumulated during the build process will be relaxed as the component takes up its natural, and undesirable, distorted form.

Processes are now being developed to relieve these stresses at stages within the build process through methods such as mechanical rolling of the last deposited surface of the work piece, or by ultrasonic peening of the surface. The difficulty with these processes is that there are no indications to the operator as to when the correct amount of de-stressing has been applied, other than to remove the clamps and inspect the work piece for distortion. This method may prove very costly to operate, may cause difficulty with re alignment of the work piece and in most cases will be too late to take corrective action in any event.

It is accordingly an aim of the present invention to overcome at least some of the difficulties associated with the prior art.

According to a first aspect of the present invention, there is provided a method of forming a metallic component by additive layer manufacturing including the steps of:

a) mounting a work piece to ALM manufacturing apparatus including measuring means to measure stresses tending to distort the work piece, b) using a heat source to apply heat to a portion of a surface of the work piece sufficient to melt said portion;

c) adding metallic material to the melted portion and moving the heat source relative to the work piece whereby progressively to form a layer of metallic material on the work piece;

d) repeating steps b) and c) as required, whereby progressively to form the component;

e) while progressively forming the component, measuring stresses tending to distort the component with the measuring means and, if such stresses are measured to be above a predetermined threshold, stress relieving the work piece while mounted to the apparatus whereby to reduce distortion to a predetermined level, and repeating steps b) to e) as required whereby to form the component.

The invention provides a method of controlling stress levels within the work piece during manufacture of the component in a much more informed way, and to predetermined levels, and thereby enables corresponding control of distortion of the work piece and, finally, of the component.

Such increased knowledge can, for example, allow the operator to terminate the build process before the work piece becomes stress critical.

Knowing what induced stress is within a work piece allows the application of stress relieving by cold working to be carried out to a set known pre-condition without the requirement to un-clamp and remove the part from the support structure. Alternatively, such knowledge may be used to carry out an annealing or a creep forming process to the work piece to restore it to its original condition.

Secondly, by measuring the time taken to remove the built up stresses or to reduce them to an acceptable level, the build process can be simplified because further stress reduction can then be carried out with knowledge of how long each step is likely to take. Considerable cost reductions, for the build process, are also likely to result owing to the greater efficiency with which this can be carried out.

This, in turn, will improve the quality, make the job safer, reduce the labour costs, and reduce the extent of any post build heat treatment likely to be required.

The method may include positioning the measuring means in the region of extremities of the work piece and measuring distortion across at least a substantial portion, preferably the whole, of the work piece.

The step of mounting the work piece to the apparatus may include clamping the work piece to the apparatus at least partly by means of the measuring means.

The steps of measuring stresses tending to distort the work piece and stress relieving the work piece may include measuring clamping loads applied to the work piece to clamp it in position on the apparatus before ALM manufacture commences and after forming a predetermined number of layers of added material on the work piece, stress relieving the work piece, measuring the clamping loads again and, if the clamping loads exceed a predetermined said threshold, further stress relieving the work piece According to a second aspect of the invention there is provided additive layer manufacturing apparatus for forming a metallic component, the apparatus including mounting means to mount a work piece to the apparatus, a heat source to apply heat to a portion of a surface of the work piece sufficient to melt said portion; means to add metallic material to the melted portion and means to move the heat source relative to the work piece whereby progressively to form a layer of metallic material on the work piece, measuring means to measure stresses tending to distort the work piece and stress relieving means to relieve stress in the work piece while mounted to the apparatus whereby to reduce distortion of the work piece during forming of the component.

The invention may use measuring means in the form of strain measurement devices which may be built into the support structure. This facilitates the ability to monitor any change in the internal stresses in the work piece during build. When applying a de-stressing process to the work piece during the manufacturing process the information provided by the measuring means can be used to indicate when the work piece has been returned to, or near to, its original un-stressed condition. These measuring means will therefore indicate when sufficient de-stressing of the work piece has occurred. This will ensure that distortion levels in the work piece are kept within acceptable limits and will reduce risk to an operator.

Other processes could be adapted to provide similar information of residual stresses, such as hydraulics (using a pressure readout of, for example, a hydraulic load cell to determine stress in the work piece); optics, to measure distortion and flatness, and laser scanning, to measure distortion in three dimensions.

The load cell device(s) could be fitted in almost any location within the support structure and provide an indication of stress within the work piece. However, for any given design of component, consideration should be given to making the most sensitive parts of the support structure such as clamps, load pads for supporting the work piece or clamp bolts into load cells. The bed of the support structure may also provide a suitable location for a load cell. The load cell or cells may be connected to a digital readout display. In each case calibration work will be required, and selection of a suitable load range to successfully relate a digital value output from the load cell to a degree of actual bending in the work piece itself. The actual values are less critical when a stress relieving process is being implemented because, under these conditions, returning a work piece to its unstressed form is purely comparative.

The apparatus may include a computer programmed to control the heat source; the means to add metallic material to the melted portion of the surface of the work piece, the means to move the heat source relative to the work piece, and the stress relieving means in dependence upon stresses in the work piece measured by the measuring means.

According to a third aspect of the invention there is provided a computer programmed to carry out the method of the first aspect of the invention.

According to a fourth aspect of the invention there is provided a computer programme product containing a computer programme adapted to carry out the method of the first aspect of the invention.

The additive manufacturing method may be selected from the group: laser blown powder manufacture; laser powder bed manufacture, and wire and arc manufacture.

The step of stress relieving the layer may comprise applying high frequency peening to the layer which may be in the form of applying pulsed laser treatment or ultra-sonic impact treatment to a surface of the layer.

The step of applying pulsed laser treatment to the surface of the layer may include the step of applying a covering to the surface whereby to focus a shock wave generated by each laser pulse into the layer. The covering may be a sacrificial layer such as a coating or tape and/or a liquid covering.

The stress relieving means may be adapted to be applied specifically to the added layer and may thus modify the microstructure of the added layer.

The stress relieving means may thus comprise a pulsed laser whereby to apply laser peening to the added layer or may comprise ultrasonic impact treatment means. Both these treatments apply small amounts of force at high frequency to the work piece surface whereby to work harden the applied layer of metallic material.

Where a pulsed laser is used to achieve the stress relief, the apparatus may include means to assist focus of each laser pulse into the cooled added layer. Such means may deposit a sacrificial covering upon the cooled layer and may be adapted to deposit a layer of paint or tape and/or a liquid layer.

The heat source may be a laser focused upon the work piece surface and the source of metallic material may be a powder and gas delivery device adapted to deliver gas carrying the metal powder substantially to the focal point of the laser.

As a further alternative, the heat source may be a welding arc and the source of metallic material may be a metallic wire held on feed means, the arc being positioned whereby to create a weld pool on the surface of the work piece and the feed means being adapted to feed the wire to the weld pool.

The cooling means may be forced gas cooling means or water spray means and may advantageously be a cryogenic cooling means.

Figure 2:
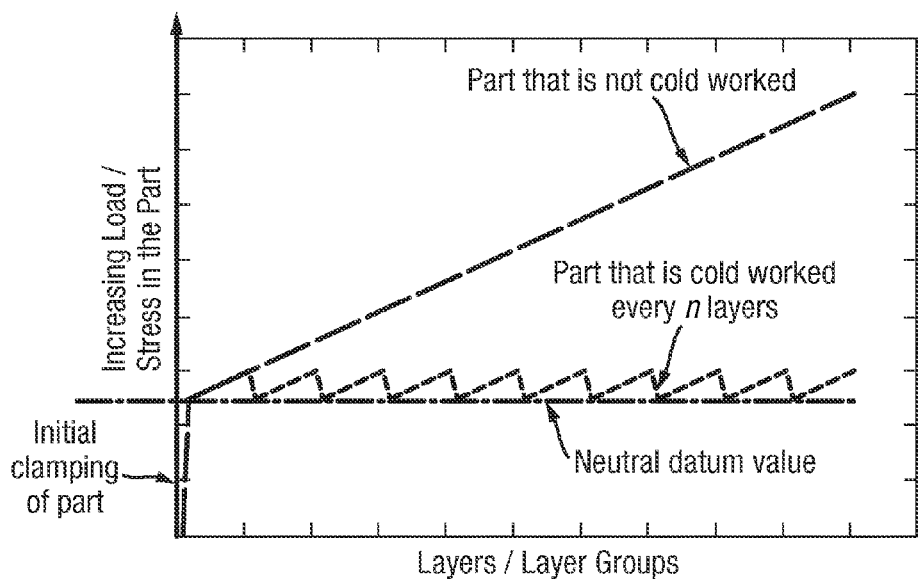
Figure 3:
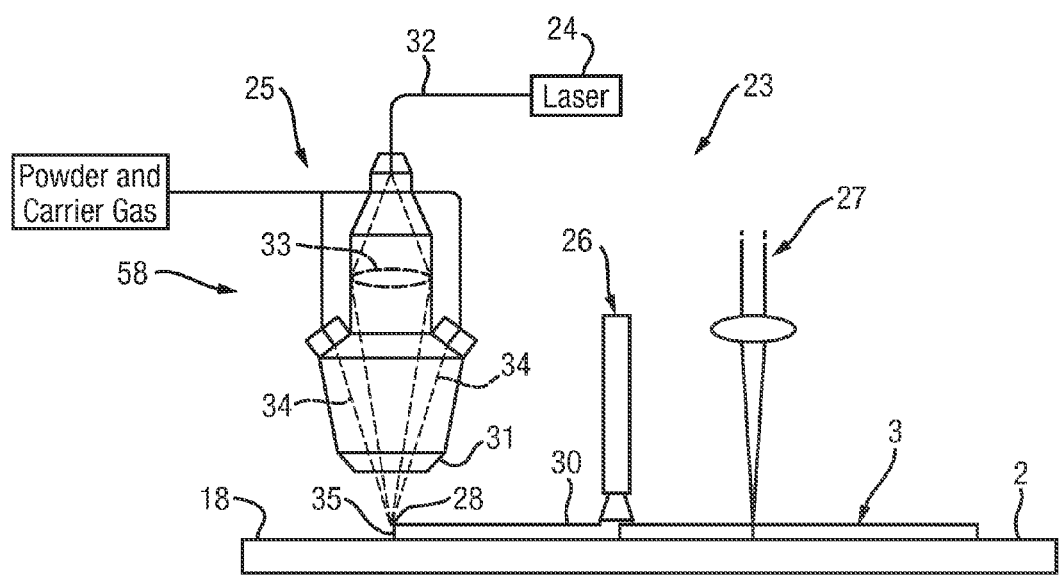

The invention will now be described by way of example with reference to the accompanying drawings of which:

FIG. 1 is a schematic side view of part of an apparatus according to the invention, FIG. 2 is a graph of layers or layer groups of added metallic material plotted against load/stress within the work piece, and FIG. 3 is a schematic side view of a further part of apparatus according to the invention.

Referring to FIG. 1, part (substantially the lower part) of apparatus according to the invention is shown. The apparatus comprises a bed 1 supporting a parent plate 2 of a work piece 3. Built up upon the parent plate 2 is a stack 4 of layers of material added by the ALM process. The bed 1 is designed as a heavy extremely rigid structure, able to both support the work piece 3 and also to prevent buckling of the work piece as internal stresses build up therein.

Holding the parent plate 2 in position are four clamps 5, 6 (only two of which are shown). Each clamp comprises a heavy bolt 7, 8, a nut 9, 10, a clamping plate 11, 12 and a load cell 13, 14. A further load cell or cells (not shown) may be incorporated into the bed 1, for example in a central region 15 of the parent plate 2. But this will depend on the particular design of work piece and is not deemed necessary here. Each load cell 13, 14 is connected to a computer 16.

In use, the nuts 9, 10 are tightened so as to clamp the clamping plates 11, 12 firmly down onto the parent plate 2 and the load cells 13, 14. The parent plate 2 will initially have no layers of added material and will be undistorted by the application of any heat from the ALM process. The compressive load experienced by the load cells will be recorded by the computer 16.

If the process has not been carried out on this design of parent plate 2 before, calibration will be required and the computer will be programmed to record various work piece data and process data as it is carried out for the first time. Such data are likely to include, as a minimum: time elapsed from application of first heat to the parent plate 2, load registered at each load cell 13, 14 at various time intervals or layer intervals, and number of layers of material 4 added to the parent plate. In addition, the data is likely to include: number of cold working cycles, amount of cold working in each cycle, amount of heat applied to the work piece by heating means (not shown in FIG. 1) which is used to melt the metal added to each layer in the stack 4, and various weight and dimensional information relating to the work piece, as so far built. Further data may also be recorded.

Once all this data has been recorded by the computer for the first build of the component, it can be inspected by the process designer and the process can be optimised for future components. For example, variables may be adjusted and optimised as experience of the build process is built up. Such variables may include: the size and thickness of the parent plate; the thickness of each layer of added material; the number of layers added between cold working steps; the amount of cold working done at each step (this may vary as the component is built up in any event), and the reduction in load recorded at each load cell 13, 14 after each cold working step.

The computer 16 may be programmed to input such data and to process it either to predict a suitable cold working schedule for a particular component build or, if the computer is operatively linked to both ALM apparatus and cold working apparatus, (see FIG. 3) to control the build itself.

Clearly, once a component has been built with the apparatus of the invention, the computer can use a database compiled of the component and process parameters to calculate control algorithms and build parameter predictions for different components.

Further details of the process will now be given. If the clamping plates 11, 12 are fastened down by the nuts 9, 10 to the bed 1, over the parent plate 2, to a high torque value, the stress in the load cells 13, 14 indicates the clamping force only and provides a 'neutral datum value' for the parent plate 2 (approximately 4KN is shown in FIG. 1).

An ALM blown powder and laser, robot controlled machine operated in an atmosphere of Argon (see FIG. 3) may be used to build up layers 4 of material on the parent plate 2. With 4 layers @ 0.25 mm/layer built up on the parent plate 2, it now has 1 mm of build up on one side of the plate 2. This will start to induce a bending stress in the work piece 3, as indicated schematically at 17. However, as the clamps 5, 6 resist this bending force, they will carry more load and, owing to the geometry of the clamps 5, 6, where each clamping plate 11, 12 effectively pivots about the nut on its bolt 7, 8, when the work piece 3 bends upwards and rises from the bed 1, load cells 13, 14 will register this increase. Subtracting the neutral datum load value will indicate a level of induced stress build up in the work piece.

The new grown layer or stack 4 of layers is now subjected to a cold working process to stress relieve the work piece. The cold working may be carried out by cold rolling or by mechanically or ultrasonically peening an upper surface 18 of the stack 4. The extent of cold working required is indicated by the loading values indicated on the load cells 13, 14. The ideal state is reached when the loading value is returned to the original neutral datum value. When this value is reached, the build process can begin once again.

Referring to FIG. 2, the induced stress loading from an addition of a build layer and the subsequent cold working process to neutralise the built up stresses is indicated by the saw tooth line. The diagonal upper line indicates the induced stress build up if cold working is not applied.

Referring to FIG. 3, like parts will be given the same reference numerals as in FIG. 1. A treatment station 23, for mounting on the bed 1 of FIG. 1, is made up of a heat source in the form of a high powered laser 24, a source of metallic material in the form of a powder delivery system 25, cooling means in the form of a forced cooling nozzle 26 and stress relieving means in the form of a high frequency pulsed laser 27.

The laser 24 is focused upon a focal point 28 on an upper surface 18 of the work piece 3, whereby to melt the surface 18 to form a weld pool. The laser 24 is controlled by the computer 16 (not shown in FIG. 3) to deliver a laser beam via an optical fibre 32 to conventional focussing optics 33 which focus the laser beam to the focal point 28 on the surface 18 of the work piece.

The powder delivery system 25 delivers powder to the vicinity of the laser focal point 28. Thus, the powder is sintered as it is deposited on the work piece surface 18 to form a layer or bead 30. In the present embodiment, the powder is stainless steel 316 powder, obtained from the company Höganäs (Great Britain) Ltd, having a place of business at Munday Works, 58/66 Morley Road, Tonbridge, Kent, United Kingdom. The powder grains have a diameter between 36 μm and 106 μm. Powder delivery system 25 delivers powder at a rate of three grams per minute through a deposition nozzle 31, along three delivery lines 34 disposed symmetrically around the deposition nozzle 31.

The laser apparatus 24, 33 is mounted so as to be moveable under the control of the computer 16 in the X-Y plane parallel to the surface of the parent plate 2, and vertically in the Z direction orthogonal to it. The laser focal point 28 thus can be directed to any point in a working envelope in the X-Y plane and vertically so as to accommodate both work pieces of different height and also regions of different height within work pieces. During operation, the treatment station 23 moves in a traverse direction, relative to the work piece 3, is indicated by arrow 58.

The laser 24 is an Nd:YAG laser operating at a wavelength of 1064 nm, and having a continuous wave power output of 500 w.

The bead 30 is cooled to a crystallised state using the forced cooling gas nozzle 26. This may use air or a cryogenic spray jet, for example.

The cooled bead 30 is then treated with the high frequency pulsed laser 27 to reduce residual stress and modify the microstructure. Many beads may be laid down beside one another and built on top of each other to form simple or complex parts and each bead 30 may have residual stress and distortion minimised, by the laser treatment, with the formation of improved microstructure.

The invention claimed is:

1. An additive layer manufacturing apparatus for forming a metallic component, the apparatus including:
   a mount comprising one or more clamps configured to mount a work piece to the apparatus;
   a heat source movable relative to the work piece and configured to apply heat to a portion of a surface of the work piece sufficient to melt said portion;
   a material delivery system configured to add metallic material to the melted portion whereby progressively to form a layer of metallic material on the work piece;
   a stress measuring system forming part of the one or more clamps and configured to measure stresses tending to distort the work piece; and
   a stress relieving system configured to apply a force to the work piece so as to relieve stress in the work piece while mounted to the apparatus whereby to reduce distortion of the work piece during forming of the component.

2. The apparatus as in claim 1 in which the stress measuring system is positioned in a region of extremities of the work piece whereby to measure distortion across at least a portion of the work piece.

3. The apparatus as in claim 1 including a cooling system configured to cool the work piece before operation of the stress relieving system.

4. The apparatus as in claim 1 in which the stress relieving system comprises a pulsed laser configured to apply laser peening to the added layer.

5. The apparatus as in claim 1 in which the stress relieving system is configured to apply ultrasonic peening to the added layer.

6. The apparatus as in claim 1 including a computer programmed to control: the heat source; the material delivery system; movement of the heat source relative to the work piece; and the stress relieving system in dependence upon stresses in the work piece measured by the stress measuring system.

* * * * *